United States Patent [19]

Reynier

[11] 3,991,844
[45] Nov. 16, 1976

[54] DEVICE AND METHOD FOR HOLDING A STORAGE BATTERY

[75] Inventor: Jacques Reynier, Eymet, France

[73] Assignee: Societe des Accumulateurs Fixes et de Traction, Romainville, France

[22] Filed: Oct. 30, 1975

[21] Appl. No.: 627,364

[30] Foreign Application Priority Data
Nov. 25, 1974  France .............................. 74.38590

[52] U.S. Cl. .............................. 180/68.5; 429/100; 429/163
[51] Int. Cl.² ........................................ B60R 18/02
[58] Field of Search ........... 180/68.5; 136/171, 173, 136/166; 248/503

[56] References Cited
UNITED STATES PATENTS

| | | | |
|---|---|---|---|
| 673,678 | 5/1901 | Chamberlain et al. ............. | 136/166 |
| 2,480,202 | 8/1949 | Stassen .............................. | 180/68.5 |
| 3,167,458 | 1/1965 | Brazell .............................. | 180/68.5 |
| 3,623,917 | 11/1971 | Chassoux ............................ | 136/171 |

*Primary Examiner*—M. H. Wood, Jr.
*Assistant Examiner*—David M. Mitchell
*Attorney, Agent, or Firm*—Kenyon & Kenyon Reilly Carr & Chapin

[57] ABSTRACT

The invention concerns a device and method for holding a storage battery provided with a general container against two walls at right angles on one of which the bottom of the container rests. According to the invention, a longitudinal part bearing vertically against the cells and not on the edge of the container is used and a pull is exerted on that part towards the ridge of the dihedral formed by the said two walls. Application of the invention is to storage batteries installed in land vehicles, sea craft or aircraft.

8 Claims, 3 Drawing Figures

DEVICE AND METHOD FOR HOLDING A STORAGE BATTERY

BRIEF SUMMARY AND BACKGROUND OF INVENTION

The invention concerns a device and a method for holding a storage battery in the angle formed by two walls (one of which can be the floor) that battery being provided with a general container containing several cells. It is a well-known method to hold in place such batteries by exerting on their top edge, diagonally opposite to the ridge of the dihedral formed by the walls, a pull directed towards that ridge, for example, by means of an angle bar bearing against the edge of the container, the pull being exerted by two tie rods on either side of the battery.

In such a battery, especially when it is installed in a land vehicle, sea craft or aircraft, it is necessary to provide chocks for clamping the cells in the container, due to manufacturing tolerances which always result in a certain play inside the container.

An aim of the present invention is to provide a device and method that dispenses with the need for use of these chocks which require manipulations and vary from one battery to the next.

It has as among its objects and features a device and a method for holding a storage battery provided with a general container containing several cells against two walls at right-angles on one of which the bottom of the container rests, that arrangement using a pull towards the ridge of the dihedral of the said walls, exerted on the battery by means of a part resting on one side of the battery parallel and diagonally opposite to the said ridge, characterized in that, in the direction perpendicular to the bottom of the said part bears against at least a portion of each of the several cells and not on the edge of the container.

In this way, the cells are biased or urged towards the walls and they themselves hold the container of the battery against these walls, and at the same time chocking the cells inside the can. It is therefore unnecessary to use extra chocking devices.

In the case where the height of the cells is less than the depth of the container, the said part comprises portions overlapping the said edge of the container without, however, bearing thereon in the direction perpendicular to the bottom of the can. In actual fact, the edge of the container is held in a gap which leaves a play between the top portion of the edge and the top of the gap. No pressure directed towards the bottom of the battery is exerted on the edge of the container, so that effectively, the component of the pulling force directed towards the bottom, is exerted directly on the storage cells, this ensuring fixation of the latter.

In an advantageous embodiment, the said component is transmitted by protruding portions of the said part, each of which is in contact with two storage cells on their adjacent top edges. In this way, the fixation of a row of storage cells is obtained by a relatively small number of contact points, this making it possible to lighten the said part.

The pull towards the dihedral of the walls can be obtained by means of an angle bar and tie rods, the said angle bar bearing on the said part.

Advantageously, and more particularly in the case where the angle bar is metallic, the said part will be made of an insulating material such as nylon or polypropylene and could, for example, be obtained by moulding.

The invention will be better understood with reference to the description of an embodiment, given only by way of an example, relating to the accompanying drawings in which.

DETAILED DESCRIPTION

Figure 1:
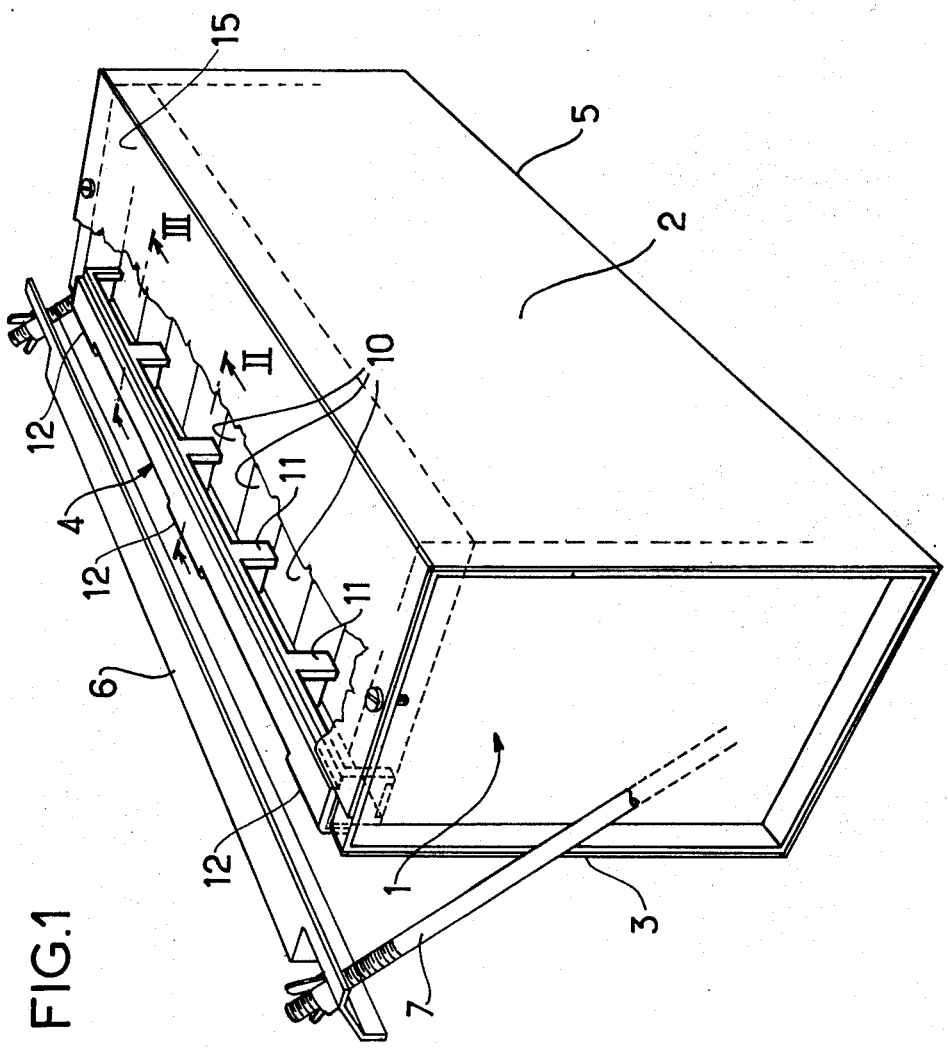
FIG. 1 is a perspective view of a storage battery to which the holding device and method according to the invention are applied.

FIG. 1 shows a storage battery with individual cells referenced 10, on which for the sake of clarity, neither the terminals nor the intercell connections have been shown. It comprises a general container 1 whose bottom and one lateral face 2 are intended to be held pressed respectively against two walls at right-angles, not shown, which may be those, for example, to a land vehicle, seacraft or aircraft. According to the invention, a longitudinal part 4 is arranged on the top face of the storage cells 10 on the level of the upper ridge thereof which is diagonally opposite to the ridge 5 defined by the face 2 and the bottom of the container 1.

Figure 2:
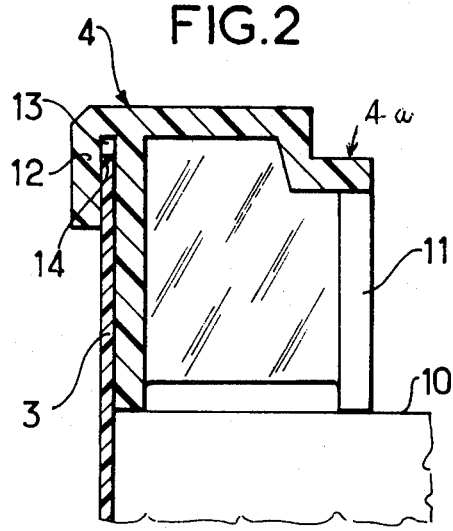
FIGS. 2 and 3 are diagrammatic views of the battery in FIG. 1, respectively showing a cross-section through the lines II—II and III—III.
Figure 3:
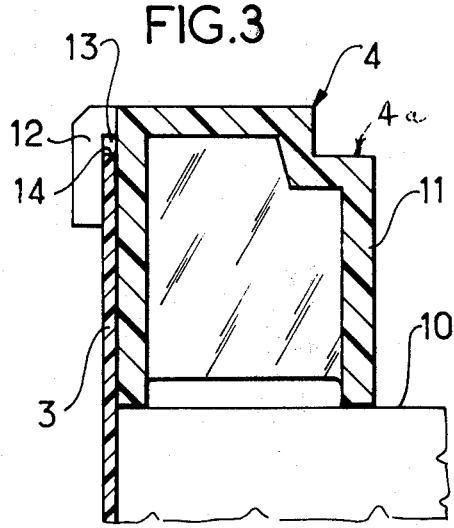

As appears more clearly in FIGS. 2 and 3, the part 4 comprises, at intervals, projections 11 whose bases rest on the storage cells 10 and, more particularly, on the upper faces of two adjacent cells.

Moreover, since the height of the lateral wall 3 of the container 1 is greater than that of the cells 10, the part 4 has been provided with portions 12 overlapping the upper edge 14 of that wall, gaps 13 being nevertheless provided between the portions 12 and the upper container edge 14 so that they do not bear against that edge. The function of the portions 12 is to fix the part 4 in the horizontal direction.

The container 1 is here provided with a lid 15 resting on one horizontal side on a shoulder 4a of the part 4. The lid 15 is traversed by the current output terminals of the battery which are not shown.

A pulling is directed towards the ridge 5 formed by the two above-mentioned walls at right-angles by applying against the part 4 an angle bar 6 provided with tie rods one of which is referenced 7. These tie rods end at fixed points integral with the two walls of the vehicle which are not shown.

When the angle bar 6 is mounted in place on part 4 and the nuts of the tie rods 7 tightened the vertical component of the resultant pull is exerted by the projections 11 on the upper surfaces of cells 10 which are thus locked against the horizontal wall of the vehicle via the bottom wall of container 1 which is thus also fixed by the cells themselves on the said horizontal wall of the vehicle. The horizontal component of the pulling force is, exerted on the wall 2 of the container by the portions 12 of the part 4. The cells are thus locked against the second wall of the vehicle via a wall 2 of the container directly or through another row of cells, if the battery comprises two rows of storage cells. The pressure exerted by the angle bar 6 therefore not only fixes the battery in relation to the two walls of the vehicle that are at right-angles, but also fixes the storage cells 10 within the container 1, thus dispensing with the necessity of using chocks having suitably selected dimensions between the container and the cells.

The part 4 is advantageously obtained by molding an insulating material such as nylon or polypropylene. The angle bar 6 can be metallic.

It must be understood that the invention is not limited to the embodiment described and illustrated hereabove. Variations within the scope of the claims are possible and are contemplated.

What is claimed is:

1. Method for securing a storage battery provided with a general container containing several cells against two rigid walls at right-angles on one of which the bottom of the container rests, comprising effecting a diagonally directed pulling force on said battery towards the ridge of the dihedral of the said walls positioned at a point on one side of the battery parallel and diagonally opposite to the said ridge, the vertical component of said force being applied only to said cells in a direction perpendicular to the bottom of the container and acting only against at least portions of the several cells but being spaced from the edge of the container at said point, said pulling force being directed diagonally of and toward said ridge to provide said vertical force component which is transmitted to at least portions of several of said cells to press the latter against the bottom of said container and the bottom of said container against one of said rigid walls.

2. Method according to claim 1 comprising providing an angle bar, positioning said angle bar to apply said pulling force as aforesaid providing tie rods fixed at one end and adjustably and tightenably connected to said angle bar, and tightening said rods to exert said force on said cells and container.

3. Method according to claim 1 including applying the horizontal component of said diagonally directed pulling force only to a wall of said container so as to bias the same towards the second of said rigid walls.

4. In combination with a vehicle having a pair of fixed walls at right angles defining a vehicle ridge, and a battery comprising individual cells, a container for said cells having a pair of walls at right angles defining a container ridge, one of which container walls constitutes its bottom and is adapted to rest on one of said vehicle walls with the other of said container walls adjacent the other of said vehicle walls, that improvement comprising means to exert a tightening force on the cells which is transmitted from the cells via said container to one said walls of said vehicle as a vertical force component, said means comprising a part located adjacent a side of said container diagonally opposite said vehicle and container ridges, projecting members depending from said part and resting on upper surfaces of at least some of said cells, and means including an angle bar so as to apply diagonal tightening force via said angle bar to said part, said force providing a vertical component pressing said cells against the container bottom and said bottom against said one of said vehicle walls and said force also providing the horizontal component biasing the said last-named container wall against said other of said vehicle walls.

5. The combination of claim 4, wherein said part includes a dependent element spaced from and overlapping an upper edge of said container on its outer side diagonally across from said container ridge.

6. The combination of claim 4 wherein said part includes a shoulder, and also including a lid for said container resting on said shoulder.

7. The combination of claim 4 wherein said part is of insulating material.

8. In combination with a vehicle having a pair of fixed walls at right angles to each other and defining a ridge and a battery comprising a plurality of cells, a container for said cells, said container having a pair of walls at right angles to each other and defining a container ridge, one of which container walls constitutes the bottom of said container adapted to rest on one of said two vehicle walls with the other of said container walls defining said container ridge disposed parallel to the other of said vehicle walls, that improvement comprising means to exert pulling force vertically on the cells which is transmitted via said container to one of said walls of said vehicle, said means comprising a part resting on one side of said cell and container diagonally opposite said container ridge, projecting members depending from said part and adapted to rest on upper surfaces of respective pairs of adjacent cells, a dependent element on said part spaced from and overlapping an upper edge of said container on its outer side, a lid for said container an angle bar mounted over said part, tie rods, one end of each of which engages said angle bar and whose other ends are fixed, tightening means on said tie rods to exert a pulling force on said angle bar and said part directed diagonally toward the said ridges of said vehicle walls and said container walls, the vertical component of said pulling force being applied by said projecting members of said part directly against said cells to force said cells tightly against said bottom wall of said container and also thereby force the said bottom wall of said container against one of said vehicle walls, and the horizontal component of said pulling force serving to bias said other wall of said container against the other of said vehicle walls.

* * * * *

UNITED STATES PATENT AND TRADEMARK OFFICE
CERTIFICATE OF CORRECTION

PATENT NO. : 3,991,844
DATED : November 16, 1976
INVENTOR(S) : Jacques Reynier

It is certified that error appears in the above-identified patent and that said Letters Patent are hereby corrected as shown below:

Item 73

The correct name of the Assignee is:

SAFT-Societe des Accumulateurs Fixes et de Traction

Col. 3, line 29 insert a comma after "aforesaid".

Col. 4, line 37 insert a comma after "container".

Signed and Sealed this

Fifteenth Day of February 1977

[SEAL]

*Attest:*

RUTH C. MASON
*Attesting Officer*

C. MARSHALL DANN
*Commissioner of Patents and Trademarks*